United States Patent
Mokhasi (10) Patent No.: US 11,044,249 B2
(45) Date of Patent: Jun. 22, 2021

(54) SECURE AUTHENTICATION USING BIOMETRIC INPUT

(71) Applicant: VISA INTERNATIONAL SERVICE ASSOCIATION, San Francisco, CA (US)

(72) Inventor: Gaurav Srikant Mokhasi, Bengaluru (IN)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 106 days.

(21) Appl. No.: 15/773,724

(22) PCT Filed: Jan. 8, 2016

(86) PCT No.: PCT/US2016/012739
§ 371 (c)(1),
(2) Date: May 4, 2018

(87) PCT Pub. No.: WO2017/119908
PCT Pub. Date: Jul. 13, 2017

(65) Prior Publication Data
US 2018/0332036 A1 Nov. 15, 2018

(51) Int. Cl.
*H04L 29/06* (2006.01)
*G06F 21/32* (2013.01)
(Continued)

(52) U.S. Cl.
CPC .......... *H04L 63/0861* (2013.01); *G06F 21/32* (2013.01); *G06Q 20/32* (2013.01);
(Continued)

(58) Field of Classification Search
CPC ... H04L 63/0861; H04L 9/321; H04L 9/3231; H04L 63/102; H04L 2209/56;
(Continued)

(56) References Cited

U.S. PATENT DOCUMENTS 6,433,760 B1 8/2002 Vaissie et al.
7,542,210 B2 6/2009 Chirieleison, Sr.
(Continued)

FOREIGN PATENT DOCUMENTS

EA 20272 1/2015
EP 2887253 6/2015
(Continued)

OTHER PUBLICATIONS

IP.com Search Query Jul. 15, 2020 (Year: 2020).*
(Continued)

*Primary Examiner* — Samson B Lemma
*Assistant Examiner* — Blake I Narramore
(74) *Attorney, Agent, or Firm* — Kilpatrick Townsend & Stockton LLP (57) ABSTRACT

A method is disclosed. The method includes receiving, by a computing device, one or more inputs caused by at least one left-eye wink by a user or at least one right-eye wink by the user. The method further includes converting the one or more inputs into a numeric value. The method further includes authorizing the user based on the numeric value of the one or more inputs.

20 Claims, 6 Drawing Sheets

(51) Int. Cl.
*H04L 9/32* (2006.01)
*G06Q 20/32* (2012.01)
*G06Q 20/40* (2012.01)

(52) U.S. Cl.
CPC ....... *G06Q 20/40145* (2013.01); *H04L 9/321* (2013.01); *H04L 9/3231* (2013.01); *H04L 63/102* (2013.01); *G06F 2221/2115* (2013.01); *H04L 2209/56* (2013.01)

(58) Field of Classification Search
CPC .. G06Q 20/32; G06Q 20/40145; G06F 21/32; G06F 2221/2115
See application file for complete search history.

(56) References Cited

U.S. PATENT DOCUMENTS

| | | | |
|---|---|---|---|
| 7,720,687 B2 | 5/2010 | Jung et al. | |
| 7,774,275 B2 | 8/2010 | Jung et al. | |
| 8,515,813 B2* | 8/2013 | Van Buskirk, II | G06Q 30/0273 705/14.69 |
| 8,632,182 B2* | 1/2014 | Chen | G02C 7/04 351/219 |
| 8,963,806 B1 | 2/2015 | Starner et al. | |
| 9,047,512 B2 | 6/2015 | Otis et al. | |
| 9,104,886 B1* | 8/2015 | Dolbakian | G06F 21/6245 |
| 9,357,391 B1* | 5/2016 | Alsvig | H04W 12/06 |
| 2002/0070964 A1* | 6/2002 | Botz | G06F 21/31 715/741 |
| 2007/0033054 A1* | 2/2007 | Snitkovskiy | G10L 15/22 704/275 |
| 2011/0213709 A1* | 9/2011 | Newman | G06F 21/32 705/44 |
| 2011/0221669 A1 | 9/2011 | Shams et al. | |
| 2011/0271118 A1* | 11/2011 | Mahmoud Abd Alla | G06F 21/31 713/183 |
| 2012/0081282 A1* | 4/2012 | Chin | G06F 3/011 345/156 |
| 2013/0239187 A1* | 9/2013 | Leddy | H04L 9/3226 726/6 |
| 2013/0275309 A1* | 10/2013 | Kwong | G06Q 20/40145 705/71 |
| 2014/0007224 A1* | 1/2014 | Lu | G06F 21/32 726/19 |
| 2014/0050371 A1* | 2/2014 | Inkumsah | G06F 21/36 382/117 |
| 2014/0289834 A1* | 9/2014 | Lindemann | G06Q 20/42 726/7 |
| 2015/0186720 A1* | 7/2015 | Tsou | A61B 5/1171 348/78 |
| 2015/0302252 A1* | 10/2015 | Herrera | G06K 9/00281 382/117 |
| 2015/0379332 A1 | 12/2015 | Matsunaga et al. | |
| 2016/0063228 A1* | 3/2016 | Fang | G06F 3/0362 726/19 |
| 2016/0063235 A1* | 3/2016 | Tussy | G06K 9/00288 726/6 |
| 2016/0269399 A1* | 9/2016 | Abreu | H04L 63/0861 |
| 2017/0076078 A1* | 3/2017 | Kim | G06F 21/32 |

FOREIGN PATENT DOCUMENTS

| | | |
|---|---|---|
| RU | 2538283 | 1/2015 |
| WO | 2015174647 | 11/2015 |
| WO | 2017119908 | 7/2017 |

OTHER PUBLICATIONS

EP16884119.5 , "Extended European Search Report", dated Oct. 22, 2018, 7 pages.
RU2018128778 , "Office Action", dated Sep. 28, 2018, 5 pages.
"Rival to Oculus Rift Features Eye-Tracking Interactivity", Available on Internet at: https://www.psfk.com/2015/05/oculus-rift-fove-eye-tracking-virtual-reality-headset.html, 5 pages.
PCT/US2016/012739 , "International Preliminary Report on Patentability", dated Jul. 19, 2018, 11 pages.
RU2018128778 , "Office Action", dated Aug. 27, 2019, 14 pages.
Pymnts, "How Virtual Reality Tech Might Transform Retail", Available on Internet at: http://www.pymnts.com/news/2015/how-virtual-reality-tech-might-transform-retail/, Jun. 24, 2015, 5 pages.
Julius, "Optikey Type Click Speak", Optikey Type Click Speak, Available on Internet at: https://github.com/JuliusSweetland/OptiKey/wiki, Nov. 24, 2017, 3 pages.
Baldwin, "Fove headset uses eye-tracking to make VR more real", Available on Internet at: https://www.engadget.com/2015/05/19/hands-on-fove-vr/, 5 pages.
Holmes , "Virtual Reality Platform Uses Digital Currency for Marketplace Micro Payments", Available on Internet at: https://bravenewcoin.com/news/virtual-reality-platform-uses-digital-currency-for-marketplace-micro-payments/, Oct. 18, 2015, 6 pages.
PCT/US2016/012739 , "International Search Report and Written Opinion", dated Sep. 27, 2016, 14 pages.
Rowley , "Some Speculation on the Future of Payments in Virtual Reality", Available on Internet at: http://jasondrowley.com/2015/09/09/some-speculation-on-the-future-of-payments-in-virtual-reality/, Sep. 9, 2015, 11 pages.
Khandelwal, Hacker Finds a Simple Way to Fool IRIS Biometric Security Systems , available on Internet at https://thehackernews.com/2015/03/iris-biometric-security-bypass.html, Mar. 6, 2015, 3 pages.

* cited by examiner

SECURE AUTHENTICATION USING BIOMETRIC INPUT

CROSS REFERENCE TO RELATED APPLICATIONS

This application is the US national stage of PCT/US2016/012739, filed Jan. 8, 2016, the disclosure of which is incorporated herein by reference in its entirety.

BACKGROUND

Computing devices can be utilized to conduct online transactions and/or to obtain access to a resource or a location. For example, a computing device may be utilized to collect access data that is passed to an access device in order to allow the user of the computing to access a room in a building. In another example, the computing device may collect access data such as account data which may allow the user of the computing phone to complete an online transaction.

In many cases, the user of the computing device must enter an authorization code or biometric data to be authenticated before a transaction (e.g., an online payment, entry to a secure location, access to one or more electronic documents, access to a computer, etc.) may be completed. In some cases, authenticating the user with biometric data (e.g., an iris scan) alone may not provide a desired level of security. Additionally, entering an access data (e.g., an authorization code) by hand can be unsecure as someone nearby may be able to ascertain the authorization code by watching the user as he enters the access data. Additionally, a user may become frustrated with the need to enter such data by hand as it may be tedious and requires the user's hand to be free. Such frustration may inhibit the user from completing the transaction.

Embodiments of the invention are directed to methods and systems that are more convenient for users to provide secure access utilizing a computing device. Embodiments of the invention address these and other problems, individually and collectively.

BRIEF SUMMARY

Embodiments of the invention are directed to methods and systems that improve security when collecting access data (e.g., biometric data and/or other user input such as an authorization code) utilizing a computing device. In some examples, the computing device may be configured with an iris scanner and/or an eye-tracking device.

One embodiment of the invention is directed to a method comprising steps including: receiving, by an optical device, one or more inputs caused by at least one left-eye wink by a user or at least one right-eye wink by the user. The steps may further include converting the one or more inputs into a numeric value and authorizing the user based on the numeric value of the one or more inputs.

Another embodiment of the invention is directed to an optical device configured to perform the above described method.

Another embodiment of the invention is directed to a method comprising steps including: receiving, by an optical device, a transaction request, wherein the transaction request includes an iris scan associated with the user of the optical device. The steps may further comprise authenticating the user based on the iris scan. The steps may further comprise receiving, by the optical device, one or more inputs caused by at least one left-eye wink by a user or at least one right-eye wink by the user. The steps may further comprise converting the one or more inputs into a plurality of numeric values. The steps may further comprise authorizing the user based on the plurality of numeric values. The steps may further comprise processing the transaction request when the user is authenticated and authorized.

Another embodiment of the invention is directed to a server computer configured to perform the above described method.

These and other embodiments are described in further detail below, with reference to the Figures and Detailed Description.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the invention can allow for secure, hands-free input of access data utilizing a computing device. In at least one embodiment, a user may utilize a computing device (e.g., an optical device) configured with one or more biometric sensors (e.g., an iris scanner and/or an eye-tracking device). Utilizing such a computing device, a user may conduct a transaction (e.g., a payment transaction, a request for entry of a secured location, triggering of an event such as ignition of a motor vehicle engine, etc.). In one non-limiting example, the computing device may be a virtual reality headset configured with one or more biometric sensors. The user may be utilizing the virtual reality headset to interact with a virtual reality environment (e.g., a virtual reality shopping place, a virtual reality game, etc.). During such interaction, the user may desire to conduct a purchase transaction. In some embodiments, upon initiating a purchase transaction, biometric data such as an iris scan may be elicited from the user. The biometric data may be utilized to authenticate the user. Upon authentication, authorization data (e.g., an authorization code) may be collected from the user via the computing device. For example, the computing device may be configured to recognize eye winks. An "eye wink" is the closing of one eye while the other eye remains open. In some embodiments, a left eye-wink may indicate a numeric value (e.g., 2), while a right eye-wink may indicate a different numeric value (e.g., 1). The user may input a series of left-eye and/or right-eye winks that together represent a numeric value. This numeric value may correspond to a digit of an authorization code. The computing device may be configured to enable the user to enter in one or more digits in the manner described above to input a number of digits corresponding to an authorization code. In the current example, upon entry of the authorization code, the transaction may be authorized. For example, if the authorization code matches a stored authorization code the transaction may be deemed to be authorized. Upon determining that the transaction is authorized, the purchase may be completed and the user's payment account may be charged the appropriate amount of purchase.

In some embodiments, the transaction may constitute a request for entry of a secured location. In these embodiments, the user may interact with a computing device located, for example, near an entrance of a secured location. The computing device may collect an biometric data and/or an authorization data as described above. Upon authenticating and/or authorizing the user via the biometric data and/or authorization data, a device at the secure location may be enabled to allow entry (e.g., a door may be unlocked). Entry may be allowed using a service call transmitted to a computing device responsible for managing access to the secure location.

In yet another embodiment, the transaction may constitute a request to start a vehicle engine. The user may interact with a computing device of the vehicle that is configured to collect biometric data and/or authorization data in the manner described above. Upon authenticating and/or authorizing the user via the biometric data and/or authorization data, the computing device may cause the vehicle to start its engine. Entry may be allowed using a service call transmitted to a computing device responsible for managing ignition events of the vehicle.

In yet another embodiment, the transaction may constitute a request to access an electronic folder/document or a computer. The user may interact with a computing device (e.g., the computer) that is configured to collect biometric data and/or authorization data in the manner described above. Upon authenticating and/or authorizing the user via the biometric data and/or authorization data, the computing device may allow the user access (e.g., to the computing device and/or a number of folders/documents).

Before discussing detailed embodiments of the invention, some descriptions of certain terms may be useful.

A "computing device" may be any suitable device that can perform computations, and that can communicate with other devices. An optical device is an example of a computing device that is configured with one or more biometric sensors. A computing device may be a mobile computing device (e.g., a cellphone). In other embodiments, the computing device may be stationary (e.g., a virtual reality headset, a desktop, etc.)

A "service provider computer" may typically be a computer or cluster of computers maintained by a provider of a service. For example, the service provider computer can be a large mainframe, a minicomputer cluster, or a group of servers functioning as a unit to provide a service upon request. The service may be requested by a client device via a network connection. In one example, a service provider computer may be a database server coupled to a Web server. The service provider computer may be associated with an entity such as a merchant, a payment processing network, a wallet provider, an authentication cloud, an acquirer, an issuer, or an access provider.

A "transaction" may be any interaction or exchange between two or more parties. For example, a transaction may include a first entity requesting resources from a second entity. In this example, the transaction is completed when the resources are either provided to the first entity or the transaction is declined. In at least one embodiment, a transaction may relate to a payment transaction for goods or services between a user and a merchant. In some embodiment, a transaction may relate to requesting and receiving access to a secured location. In still further embodiments, a transaction may relate to providing input in order to trigger an event (e.g., the ignition of a vehicle).

A "transaction request" may be an electronic message that is used to request a transaction. For example, a transaction request may include transaction details such as any information associated with a current transaction, such as the transaction amount, merchant identifier, merchant location, etc., as well as any other information (e.g., biometric data) that may be utilized in determining the identity of a user and/or authorization data collected from the user.

An "initiation request" may be an electronic message that is used to initiate a process. For example, an initiation request may be used to initiate an authentication process on a computing device. In another example, an initiation request may be used to initiate an authorization process on a computing device.

"Biometric data" is any electronic data that is created during a biometric collection process. Examples of biometric data include iris scans, retina scans, eye-tracking data, fingerprints, and the like. Such biometric data may be unique to the user and may be utilized to authenticate the identity of the user. Some biometric data may be used as authorization data, for example, to authorize a transaction.

"Biometric sensor" is an electronic device that is configured to collect biometric data. Examples of biometric sensors include an iris scanning device, a retina scanning device, a fingerprint scanning device, an eye-tracking device, and the like.

An "iris scan" is an image of one or both irises of an individual's eyes. The patterns of an iris scan may be unique to the user. An iris scan may be utilized during a mathematical pattern-recognition process to authenticate the identity of an individual.

A "retina scan" is an image of one or both eyes of an individual. The retina blood vessels of an individual's eye may be unique to the individual. Thus, a retina scan may be utilized during a mathematical pattern-recognition process to authenticate the identity of an individual.

An "eye-tracking device" is an electronic device that is configured to track one or more eye movements of a user. In some examples, an eye-tracking device may utilize a light source and a camera. The light source may be directed toward the eye. In at least one example, the light source may be infrared. The camera, according to some embodiments, may be used to observe reflections of the light source along with visible ocular features such as the pupil of the eye. Such observed data may be used to extrapolate the rotation of the eye and ultimately, the direction of gaze. Additional information, such as blink frequency (both eyes), wink frequency (one eye) and changes in pupil diameter may be detected by the eye-tracking device.

A "virtual reality headset" is a computing device that a head-mounted device that is configured to provide vision output to a user. In at least one example, a virtual reality headset may provide the user with a computer-simulated environment that simulates a physical presence in places in a real or imaginary world that allows the user to interact with the world. Examples of a virtual reality headset include the Oculus Rift Headset®, the PlayStation VR® headset, and the like. In at least one embodiment, the virtual reality headset may be configured with one or more biometric sensor that is configured to collect biometric data.

"Authorization data" may include any data suitable for authorizing a transaction. Authorization data may be obtained from a user or a device that is operated by the user. Examples of authorization data obtained from a user may include a PIN (personal identification number), a birthdate, a zip-code, a password, a social security number, a phone number, an expiration date, a number of verification values (e.g., CVV, CVV2, dCVV, dCVV2), etc.

An "application" may be a computer program that is used for a specific purpose.

An "authentication request message" may be an electronic message that is used to authenticate a user. For example, an authentication request message may biometric data of the user.

An "authentication response message" may be an electronic message that is used to indicate whether or not the user has been authenticated.

An "authorization request message" may be an electronic message that is used to obtain authorization for a transaction from an authorizing computer. An authorization request message may also comprise authorization data such as an authorization code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account.

An "authorization response message" may be an electronic message reply to an authorization request message that authorizes or denies authorization for a transaction. The authorization response message may be generated by an issuing financial institution, a payment processing network, an access processing device (e.g., a server computer), and the like. The authorization response message may include, by way of example only, one or more of the following status indicators: Approval—transaction was approved; Decline—transaction was not approved; or Call Center—response pending more information. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. In some embodiments, a payment processing network may generate or forward the authorization response message to a third-party computer (e.g., operated by a merchant).

A "third party entity" is any entity that may be separate from a service provider. A third party entity may maintain a server or a cluster of servers, which may be in communication with a network. For example, a third party entity may be a retail provider that maintains an electronic item catalog of items offered for sale.

"Payment information" may be any information designed to provide access to an account for making payment transactions. For example, payment information may include a credit card number, a bank account number, a user id, a token, or any other suitable identifier. The payment information may be associated with a monetary value, a discount, or a store credit. In some embodiments, payment information may refer to a mileage plan or other reward point system. The payment information may also be associated with an entity such as a bank, a merchant, a payment processing network, or a person. For example, in some embodiments, payment information may identify a prepaid account (e.g., a gift card) or credit account with a third party entity.

An "authorization computer" may be any system involved in authorization of a transaction. The authorization computer may determine whether a transaction can be authorized and may generate an authorization response message including an authorization status (which also may be known as an authorization decision). In some embodiments, an authorization computer may be a payment account issuer computer. In some cases, the authorization computer may store contact information of one or more users. In other embodiments, the authorization computer may authorize non-financial transactions involving a user. For example, the authorization computer may make an authorization decision regarding whether the user can access a certain resource (e.g., an electronic document).

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Systems

Figure 1:
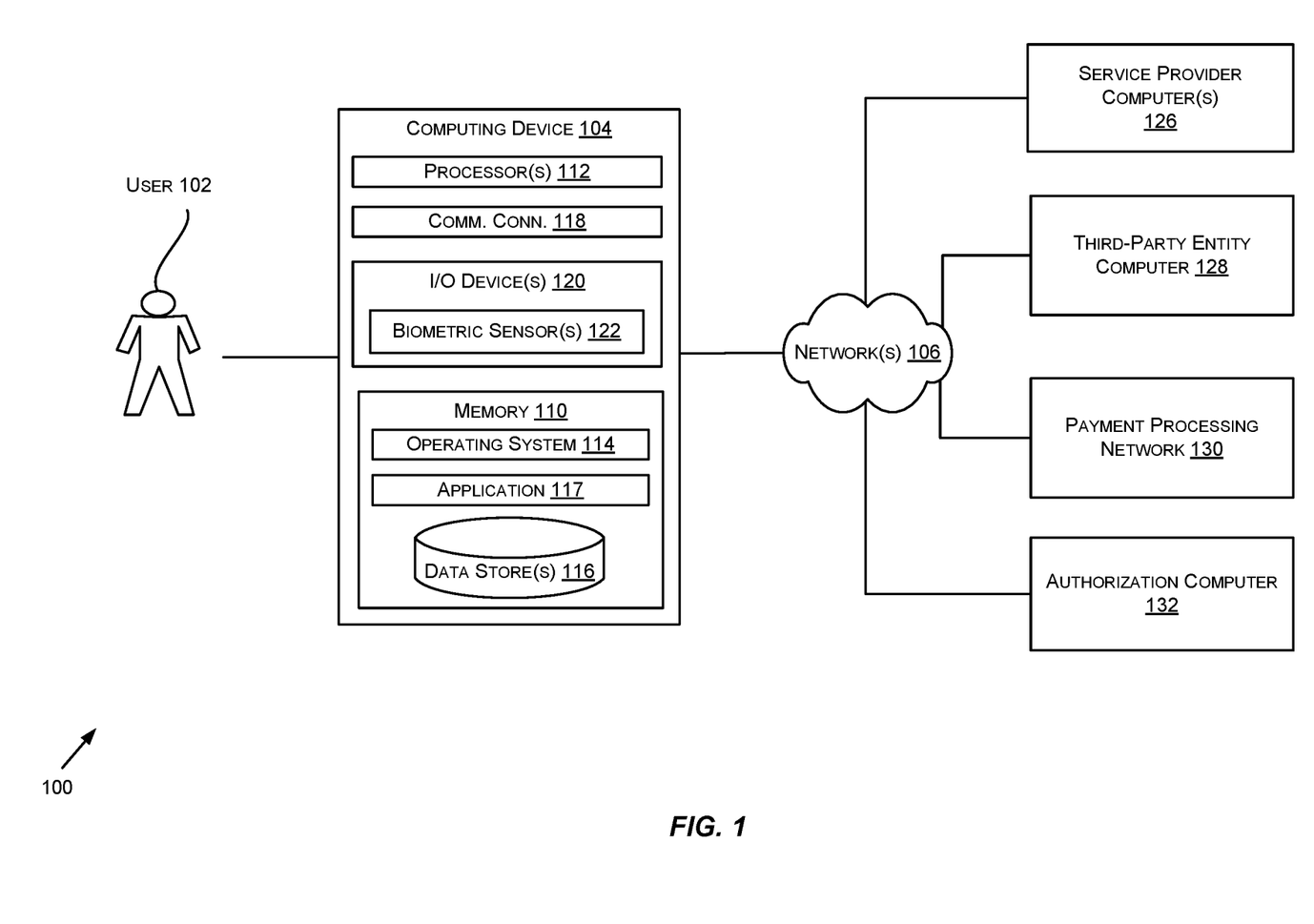
FIG. 1 shows a block diagram of a system according to at least one embodiment of the invention.

FIG. 1 shows a block diagram of a system according to an embodiment of the invention. FIG. 1 shows a user 102 that operates a computing device 104 in communication with network(s) 106. In at least one embodiment, the functionality of the computing device 104 may be provided by a single device or by multiple devices. The network(s) 106 may include any one or a combination of many different types of networks, such as cable networks, the Internet, wireless networks, cellular networks, and other private and/or public networks.

The computing device 104 may be any suitable type of computing device such as, but not limited to, a virtual reality headset, a mobile phone, a smartphone, a personal digital assistant (PDA), a laptop computer, a desktop computer, a thin-client device, a tablet PC, an electronic book (e-book) reader, an device used to gain entry into a secure location, an device used to trigger an event (e.g., ignition of a vehicle), etc. In one illustrative configuration, the computing device 104 may include at least one memory 110 and one or more processing units (e.g., processor(s)) 112). The processor(s) 112 may be implemented as appropriate in hardware, computer-executable instructions, firmware, or combinations thereof. Computer-executable instruction or firmware implementations of the processor(s) 112 may include computer-executable or machine-executable instructions written in any suitable programming language to perform the various functions described.

The memory 110 may store program instructions that are loadable and executable on the processor(s) 112, as well as data generated during the execution of these programs. The memory 112 may include an operating system 114, one or more data stores 116, and/or one or more application programs, modules, or services for implementing the features disclosed herein. Depending on the configuration and type of user computing device, the memory 110 may be volatile (such as random access memory (RAM)) and/or non-volatile (such as read-only memory (ROM), flash memory, etc.). The computing device 104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 110 may include multiple different types of memory, such as static random access memory (SRAM), dynamic random access memory (DRAM), or ROM.

Turning to the contents of the memory 110 in more detail, the memory 110 may include an operating system 114. Additionally, the memory 110 may include one or more data store(s) 116 for storing authentication data and/or other user information such as, but not limited to passwords, authorization codes, biometric data, and the like. Additionally, the memory 110 may include application 117

The computing device 104 may also contain communications connection(s) 118 that allow the computing device 104 to communicate with a stored database, another computing device or server, user terminals, and/or other devices on the network(s) 106 such as the service provider computer(s) 126, a third-party entity computer 128, a payment processing network 130, and/or an authorization computer 132. The computing device 104 may also include I/O device(s) 120, such as a keyboard, a mouse, a pen, a voice input device, a touch input device, a display, speakers, a printer, one or more biometric sensor(s) 122, and the like.

In some embodiments, the application 118 may be configured to elicit user input (e.g., via an eye-tracking device of the biometric sensor(s) 122). For example, the application 117 may depict a series of items available for purchase from a third party retailer via a virtual reality environment. In another example, the application 118 may depict a number of options for triggering an event (e.g., access to a door, ignition to a vehicle, and the like). Upon selection of an item/option by the user, the application 117 may cause a number of user interfaces to be displayed to the user to be utilized to collect biometric data (e.g., an iris scan) and/or authentication data (e.g., an authorization code).

The application 117 may allow the user 102 to interact with a service provider computer(s) 126, such as to store, access, and/or manage data. For example, the application 117 may be configured to interact with service provider computer(s) 126 in order to transmit biometric data and/or authorization data and to receive transaction feedback (e.g., an indication of a successful transaction or an indication of a failed transaction). The service provider computer(s) 126, perhaps arranged in a cluster of servers or as a server farm, may be configured to interact with third-party entity computer 128 and authorization computer 132 via the network(s) 106. The service provider computer(s) 126 may be capable of handling requests from many users (e.g., the user 102) and serving, in response, various user interfaces that can be rendered at the computing device 104 via application 117.

In some embodiments, the network(s) 106 may provide access to a third-party entity computer 128, a payment processing network 130, and/or an authorization computer 132. A third-party entity computer 128 may be any computer system (e.g., a server or group of servers) maintained by the third-party entity such as a merchant. An authorization computer 122 may be any computer system (e.g., a server or group of servers) maintained by an authorizing entity (e.g., a credit card authorization entity such as an issuer). The service provider computer(s) 126 may be in communication with the third-party entity computer 128, the payment processing network 130, and/or the authorization computer 132.

In some embodiments, the service provider computer(s) 126 may store user account information including user profile data (e.g., a username, a birthdate, a number of security questions), payment information (e.g., credit card data, bank account information, etc.), and/or biometric data and/or authorization code(s) with which the user may be authenticated and/or authorized. In some examples, the service provider computer(s) 126 may be configured to communicate with one or more systems that provide access to a secure location (e.g., a door in a building). In some examples, the service provider computer(s) 126 may be configured to communicate with one or more systems for triggering an event (e.g., starting an ignition of a motor vehicle). In at least one embodiment, the service provider computer(s) 126 may be configured to provide such access or trigger such an event described above. In some examples, the service provider computer(s) 126 (e.g., a payment processor) may submit a authorization request message to the third-party entity computer 120 related to an item (any good or service, to include digital goods and services). The authorization request message may be submitted on behalf of a user 102. For example, if a user 102 selects an item to be purchased from the third-party entity computer 128, then the service provider computer(s) 126 may cause the application 117 to elicit user input (e.g., biometric data and/or authorization code(s)) from the user. Upon receipt of the elicited user input, the service provider computer(s) 126 may authenticate and/or authorize the user. Additionally, the service provider computer(s) may request the item from the third-party entity using payment information associated with the service provider computer(s) 126. The service provider computer(s) 126 may also request authorization to charge payment information associated with the user 102 from the payment processing network 130. These requests may be made simultaneously or they may be made subsequently (one after the other).

The third-party entity computer 128 may include any suitable computational apparatus operated by a merchant. The third-party entity computer 128 may include a processor and a computer readable medium coupled to the processor, the computer readable medium comprising code, executable by the processor for performing the functionality described herein. Examples of third-party entity computer 128 may include an access device or a point-of-sale device. In some embodiments, the third-party entity computer 128 may include a web server computer that may host one or more websites associated with the third party (e.g., a merchant). In some embodiments, the third-party entity computer 128 may be configured to send data as part of a payment verification and authentication process for a transaction between the user (e.g., consumer) and the third-party (e.g., a merchant). The third-party entity computer 128 may also be configured to generate authorization request messages for transactions between the merchant and user, and route the authorization request messages to the authorization computer 132 for additional transaction processing.

The payment processing network 130 may be a network that includes or operates at least one server computer used for payment processing. The server computer in the payment processing network 130 may include a processor and a computer readable medium coupled to the processor, the computer readable medium comprising code, executable by the processor for performing the functionality described herein. In some embodiments, the server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments, the payment processing network 130 may operate multiple server computers. In such embodiments, each server computer may be configured to process transaction for a given region or handles transactions of a specific type based on transaction data.

The payment processing network 130 may include data processing subsystems, networks, and operations used to support and deliver authorization services, exception file services, and clearing and settlement services. An exemplary payment processing network 130 may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The payment processing network may use any suitable wired or wireless network, including the Internet.

Figure 2:
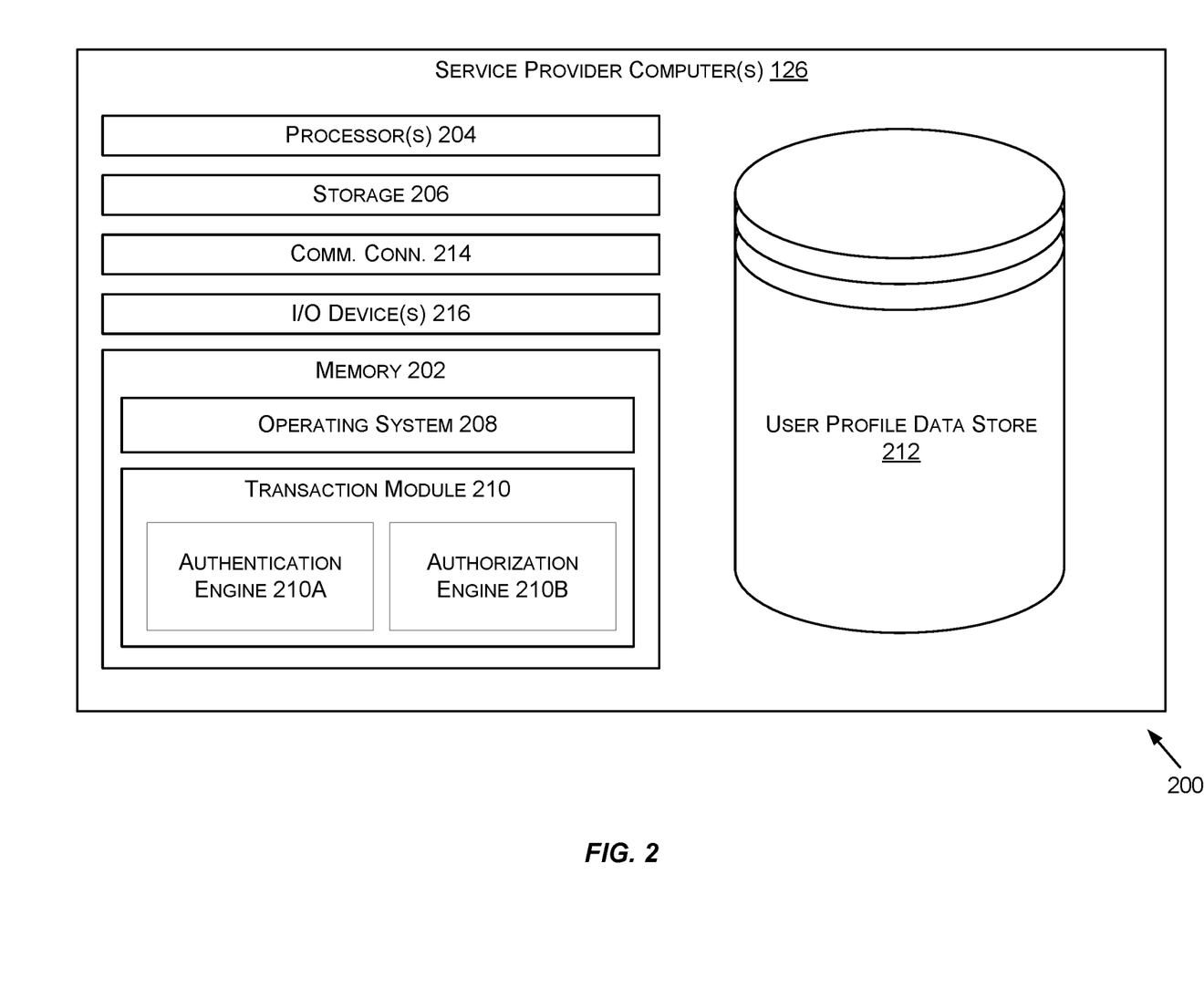
FIG. 2 depicts an illustrative example of a service provider computer capable of providing backend support for embodiment of an application, according to at least one embodiment.

FIG. 2 depicts an illustrative example of a service provider computer (e.g., the service provider computer(s) 126 of FIG. 1) capable of providing backend support for embodiment of an application (e.g., the application 117 of FIG. 1) according to at least one embodiment. The service provider computer(s) 126 may be any type of computing device including a remotely located server computer.

In one illustrative configuration, the service provider computer(s) 126 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of service provider computer(s) 126, the memory 202 may be volatile (such as random access memory (RAM)) and/or non-volatile (such as read-only memory (ROM), flash memory, etc.). The service provider computer(s) 126 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the memory 202 may include multiple different types of memory, such as static random access memory (SRAM), dynamic random access memory (DRAM) or ROM. Turning to the contents of the memory 202 in more detail, the memory 202 may include an operating system 208 and one or more application programs or services for implementing the features disclosed herein including at least a module for authenticating and/or authorizing a user and initiating a transaction with the third party entity (transaction module 210). The memory 202 may also include user profile data store 212, which provides user profile data. In some embodiments, the user profile data store 212 may be stored in a database. User profile data may include, but is not limited to, a username, a birthdate, a billing address, a shipping address, a number of security questions, or payment information (e.g., credit card data, bank account information, etc.).

The memory 202 and the additional storage 206, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the service provider computer(s) 126. The service provider computer(s) 126 may also contain communications connection(s) 214 that allow the service provider computer(s) 126 to communicate with a stored database, another computing device or server, user terminals, and/or other devices on the network(s) 106. The service provider computer(s) 126 may also include input/output (I/O) device(s) and/or ports 216, such as for enabling connection with a keyboard, a mouse, a pen, a voice input device, a touch input device, a display, speakers, a printer, etc.

Turning to the contents of the memory 202 in more detail, the memory 202 may include an operating system 208, a database containing network data (e.g., the user profile data store 212) and the one or more application programs or services for implementing the features disclosed herein, including a transaction module 210.

In some embodiments, the transaction module 210 may, in conjunction with the processor 204, be configured to receive data from the application 117 of FIG. 1 and initiate a transaction on behalf of a user. In some embodiments, the user may be associated with an account or profile stored at the service provider computer(s) 126 (e.g., at user profile data store 212. In some embodiments, the transaction module 210 may include an authentication engine 210A and an authorization engine 210B. The authentication engine 210A may be a software or hardware module configured to initiate an authentication process on the computing device 104 (e.g., via an initiation request) and receive biometric data of a user (e.g., an iris scan, a retina scan, and the like, via an authentication request message). Upon receipt of biometric data, the authentication engine 210A may perform a number of image recognition techniques in order to determine whether the received data matches stored user profile data (e.g., an iris scan or a retina scan previously-submitted by the user as a baseline image). The authentication engine 210A may be configured to trigger a process performed by the authorization engine 210B when the received data matches the stored user profile data. The authentication engine 210A may further be configured to cancel a transaction and/or provide feedback via application 117 (e.g., via a authentication response message) when the received data does not match the stored user profile data.

In at least one embodiment, an authorization process may be performed by the authorization engine 210B. The authorization engine 210B may be configured to cause one or more user interfaces to be provided to a user via the application 117. For example, the authorization engine 210B may cause (e.g., via an initiation request) the user to be provided visual instructions via application 117 related to entering an authorization data. Upon receipt of the authorization data (e.g., via an authorization request message) the authorization engine 210B may be configured to convert one or more user inputs to one or more numeric values. The authorization engine 210B may be further configured to compare the converted (or non-converted) authorization data to previously-stored user profile data (e.g., stored in user profile data store 212). When the comparison results in a match, the authorization engine 210B may, for example, initiate an transaction (e.g., via an authorization request message) to purchase an item from a third party entity (e.g., via the third-party entity computer 128 of FIG. 1). In another example, when the comparison results in a match, the authorization engine 2106 may be configured to cause the user to be provided access to a secure location. In yet another example, when the comparison results in a match, the authorization engine 210B may be configured to trigger an event at a remote system (e.g., triggering the start of an ignition of a vehicle). In situations where the comparison does not result in a match, the authorization engine 2106 may further be configured to cancel a transaction and/or provide feedback via application 117. Although the transaction module 210 is depicted as being provided by service provider computer(s) 126, it should be appreciated that the all or some portion of the functionality provided by the transaction module 210 may be provided on the computing device 104 of FIG. 1.

Methods

Figure 3:
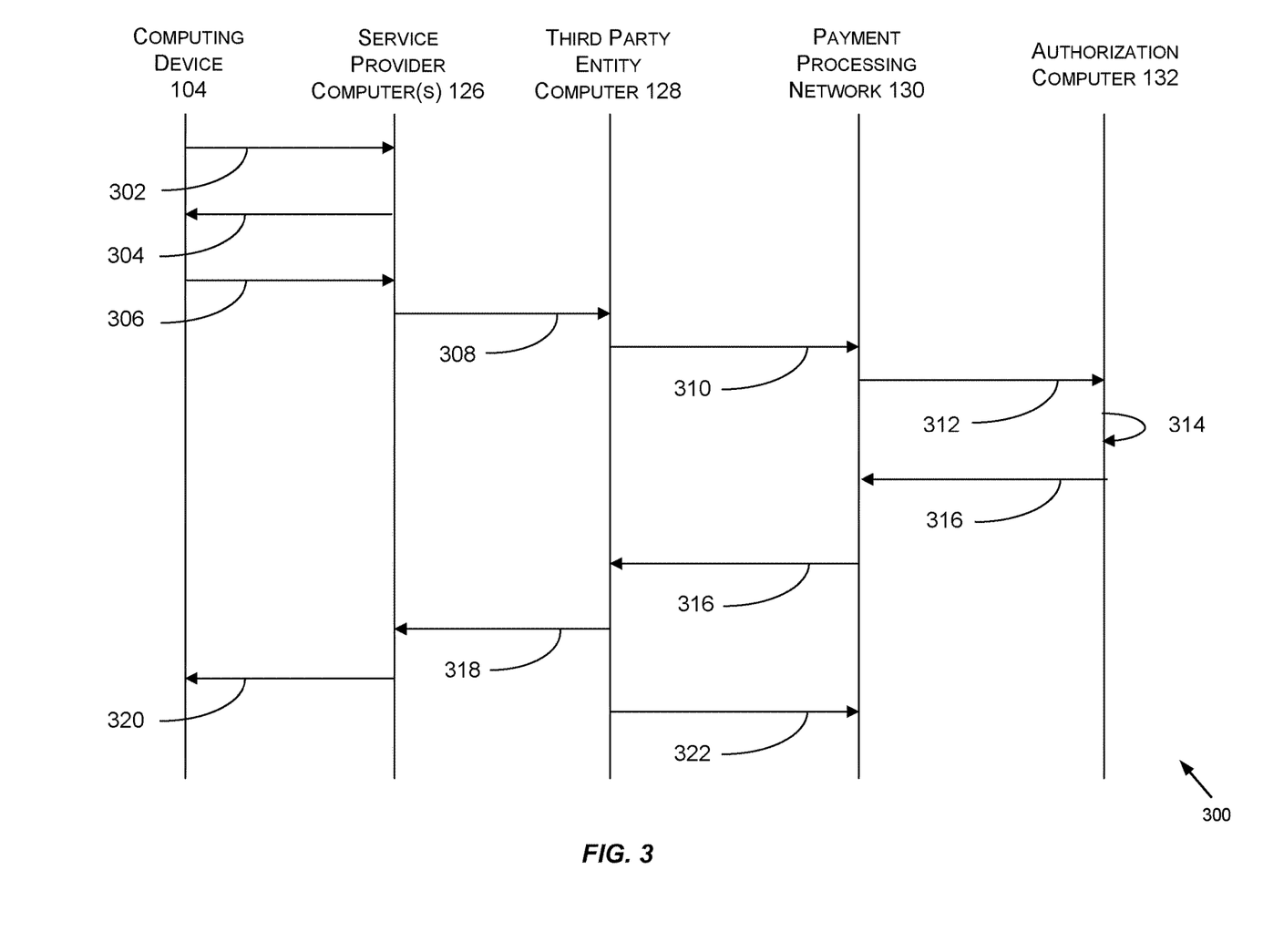
FIG. 3 shows a flowchart illustrating an example method according to an embodiment of the invention.

FIG. 3 shows a flowchart illustrating an example method 300 according to an embodiment of the invention. The process described in FIG. 3 may involve interactions between the computing device 104, the service provider computer(s) 126, the third-party entity computer 128, the payment processing network 130, and the authorization computer 132.

In some embodiments, a user may interact with the computing device 104 to initiate the described process. For example, the user may utilize application 117 of FIG. 1 to select an item to purchase as part of an option provided via a virtual reality environment (e.g., during a virtual reality game, from a virtual reality marketplace, etc.). In such examples, the computing device 104 may constitute a virtual reality headset including one or more biometric sensors (e.g., the biometric sensor(s) 122) and/or one or more eye-tracking device(s). An item may be associated with a third-party entity (e.g., a merchant). Upon selection of an item, the computing device 104 may convey the user's selection (e.g., including information about the item such as an item identifier, price, merchant identifier) to a service provider computer(s) 126 at step 302 (e.g., via a transaction request).

Upon receiving a transaction request, service provider computer(s) 126 may initiate an authentication/authorization process at step 304 on computing device 104. For example, the service provider computer(s) 126 may transmit an initiation request to the computing device 104 at step 304 to cause the computing device 104 to collect user input such as biometric data and/or one or more inputs related to an authorization data (e.g., a series of left-eye and/or right-eye winks representative of the authorization data). At step 306, the computing device 104 may convey the biometric data and/or the authorization data to the service provider computer(s) 126 (e.g., via a transaction request, an authentication request, and/or an authorization request).

It should be appreciated that the authentication/authorization process may alternatively utilize multiple exchanges of data between the computing device 104 and the service provider computer(s) 126. For example, a component of the service provider computer(s) 126 (e.g., the authentication engine 210A) may first initiate an authentication process on the computing device 104 via an initiation request. The computing device 104 may collect biometric data and convey such data to the service provider computer(s) 126 using an authentication request. Upon authenticating the user (e.g., using user profile data such as a stored iris scan), another component of the service provider computer(s) 126 (e.g., the authorization engine 210B) may initiate an authorization process on the computing device 104 using a separate initiation request. The computing device 104 may collect user input (e.g., a series of left-eye and/or right-eye winks comprising an authorization code, or a portion of an authorization code) and convey such information to the service provider computer(s) 126 using an authorization request message. The authorization engine 210B operating on either the computing device 104 and/or the service provider computer(s) 126 may be configured to convert the user input to a numeric value. The authorization engine 2106 may compare the converted (or un-converted) user input to stored user profile data. When the comparison results in a match, the authorization engine 210B may be configured to identify payment information to be used for conducting the transaction. The payment information may be associated with the user profile may be stored in relation to an account with the service provider maintained on behalf of the user. The service provider computer(s) 126 may then communicate the transaction details (including the identified payment information) and/or the authorization data to the third-party entity computer 128 at step 308 via an authorization request message.

Once the third-party entity computer 128 has obtained the transaction details, it may initiate a transaction using the provided payment information. The third-party entity computer 128 may transmit an authorization request message to a payment processing network 130 at step 310. In some embodiments, the authorization request message may be submitted to the payment processing network 130 via an acquirer. An acquirer is typically a system or an entity (e.g., a bank) that has a business relationship with a particular merchant, a wallet provider or another third party entity. The acquirer may be communicatively coupled to the third-party entity computer 128 and the payment processing network 130 and may issue and manage a financial account for the third party entity. The acquirer computer may be configured to route the authorization request for a transaction to the authorization computer 132 via the payment processing network and route an authorization response received via the payment processing network to the third-party entity computer 128. The payment processing network 130 may subsequently forward the authorization request message to an authorization computer 132 associated with the provided payment information at step 312. At step 314, the authorization computer 132 may determine whether or not to approve the transaction. For example, the authorization computer 132 may decline the transaction if there is a high likelihood of fraud. In another example, the authorization computer may decline the transaction if the payment account has insufficient funds. Once the authorization computer 132 has decided whether to approve or decline the transaction, an authorization response message may be sent to the third-party entity computer 128 via the payment processing network 130 at step 316.

The third-party entity computer 128 may, upon receiving the authorization response message, determine whether the transaction has been approved or declined. In either case, the authorization response message may be provided to the service provider computer(s) 126 (e.g., the authorization engine 210B) at step 318. The service provider computer(s) 126 may provide indication of the completed transaction to the computing device 104 at step 320. If the transaction has been authorized, the third-party entity computer 128 may complete the transaction with the service provider computer(s) 126. The third-party entity computer 128, upon completion, may send a request for release of payment related to the transaction to the payment processing network 130 at step 322. In some embodiments, the request for release of payment may be sent directly to the authorization computer 132. The authorization computer 132 may query a data store for a response identifier or transaction information included in the request for release of payment to match it to an authorization request message.

Upon completion of the transaction between the third-party entity computer 128 and the service provider computer(s) 126, the third-party entity computer 128 may initiate a product fulfillment process (e.g., a shipping process, a product download process, etc.). In some embodiments, the third-party entity computer 128 may generate a prepaid account to include a selected amount of funds. In some embodiments, the third-party entity computer 128 may generate a site from which a selected item may be downloaded.

Figure 4:
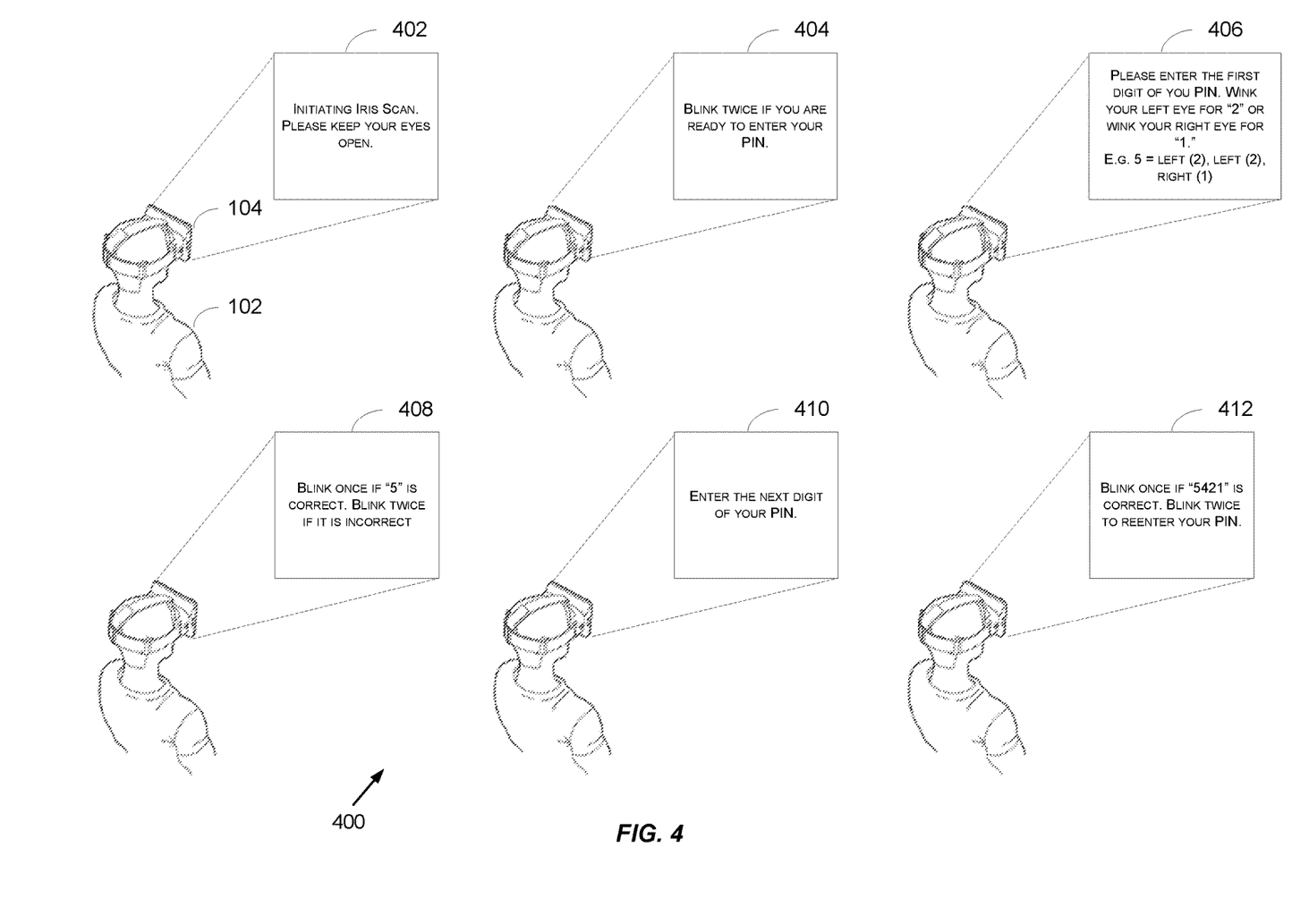
FIG. 4 shows a flowchart illustrating an example method of providing secure user input according to an embodiment of the invention.

FIG. 4 shows a flowchart illustrating an example method 400 for provided user input according to an embodiment of the invention. FIG. 4 illustrates a user (e.g., the user 102 of FIG. 1) utilizing an example of the computing device 104 of FIG. 1 (e.g., a virtual reality headset) to interact with the service provider computer(s) 126 of FIG. 1 utilizing the application 117 of FIG. 1. Although a virtual reality headset is depicted, it should be appreciated that the process may be conducted using a different computing device (e.g., a mobile device, a desktop, an device located at a secure location, a device located inside/outside a motor vehicle, etc.).

The method 400 may begin at 402, where the user may be provided instructions for initiating an iris scan. For example, the user may be informed that the iris scan will be initiated and that he should keep his eye open, although any suitable instructions may be utilized. The computing device 104 may collect the iris scan (or other biometric data) and convey such data to the service provider computer(s) 126 as described above in connection with FIG. 3.

At 404, the user may be provided instructions to indicate that he would like to initiate an input process for inputting a PIN (or other authorization code). In a non-limiting example, the user may be instructed to blink twice if he is ready to enter his PIN. Although the user may, in other embodiments, provide a left-eye wink, or a right-eye wink to indicate readiness. Upon receipt of user input indicating that the user is ready to input a PIN or other authorization data, the application 117 operating on the computing device 104 may cause instructions for entering a digit of a PIN to be displayed at 406.

For example, at 406, the user may be instructed to enter a first digit of his PIN. Further, the user may be informed that a left-eye wink may be used to indicate a value of "2" while a right-eye wink may be used to indicate a value of "1". In some examples, the values corresponding to the left eye and the right eye may be reversed. The user may be further informed that the series of inputs may be aggregated to indicate a numeric value of the first digit (e.g., left (2), left (2), right (1)=5). The user may proceed with entering a series of left-eye and/or right-eye winks. In some examples, the user may utilize right-eye winks or left-eye winks only to enter input. For example, a user may wink his right eye 5 times to indicate an input of a value of "5." In some examples, after a threshold amount of time (e.g., 2 seconds) has passed since a last eye-wink was entered, the user may be instructed to confirm his input at 408.

For example, at 408, the user may be instructed to blink once if a numeric value displayed (e.g., 5) is correct. In some examples, the user may be instructed to blink twice to indicate that the displayed numeric value is correct. In still other examples, the user may be instructed to wink his left eye to indicate that the numeric value is correct. Although other user-input may be utilized as a confirmation indication. In some examples, the user may be instructed to wink his left-eye if the displayed numeric value is correct, and to wink his right eye if the displayed numeric value is incorrect.

At 410, after confirming the first digit at 408, the user may be instructed to enter the next digit of his PIN. Accordingly, the user may be instructed in a similar fashion as described above in connection to 406-410 in order to enter a second, and any subsequent, inputs corresponding to a second, and any subsequent, digits of his PIN (or other authorization data).

At 412, the user may be instructed to confirm if a numeric value displayed (e.g., "5421") corresponding to his user input is correct. In some examples, the user may be instructed to blink once (or provide some other confirmation indication described above) to indicate that the displayed numeric value is correct or to blink twice to indicate that he would like to reenter his PIN. If the user indicates that the PIN is correct, the submitted information may be utilized (e.g., by the service provider computer(s) 126) to proceed with the transaction (e.g., a payment transaction, a request for access to a secure location, a request to trigger an event such as ignition of a vehicle, and the like).

Figure 5:
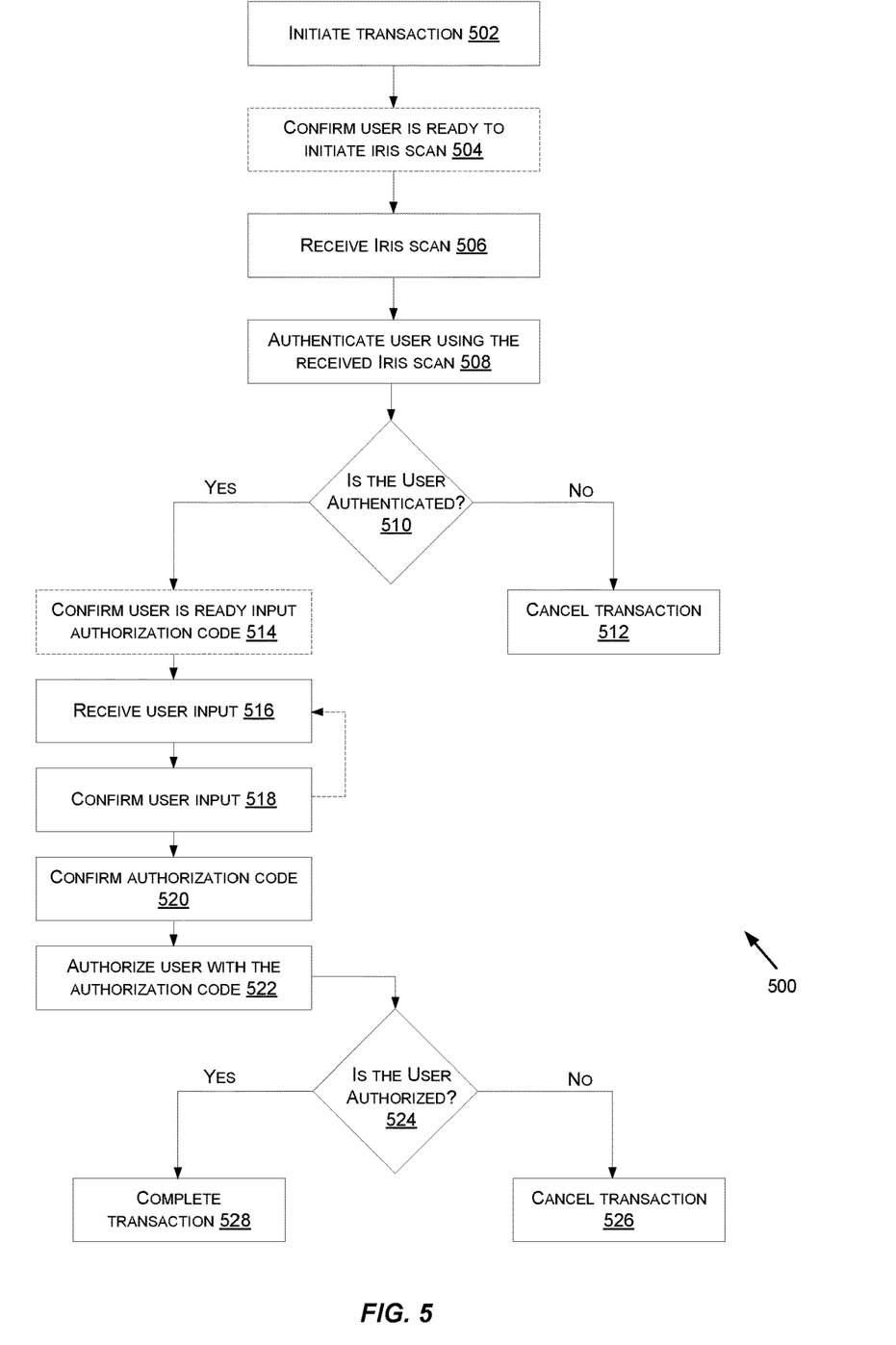
FIG. 5 shows a flowchart illustrating another example method of providing secure user input according to an embodiment of the invention.

FIG. 5 shows a flowchart illustrating another example method 500 of providing secure user input according to an embodiment of the invention. The method may begin at block 502 where a transaction may be initiated (e.g., via a transaction request) from a computing device (e.g., the computing device 104 of FIG. 1) via an application (e.g., the application 117 of FIG. 1). The transaction may relate to a purchase of an item via a virtual reality environment (e.g., utilizing a virtual reality headset). In another example, the transaction may relate to requesting access to a secure location (e.g., a locked door of a building). In yet another example, the transaction may relate to triggering an event on a remote system (e.g., starting an ignition device of a motor vehicle). The transactions discussed herein are illustrative in nature and are not intended to limit the scope of the invention. It should be appreciated that the processes described herein may be utilized in any number of transactions for which user-input (e.g., biometric data and/or an authorization code) may be utilized to authenticate and/or authorize a user and/or transaction.

At block 504, in some embodiments, the user may confirm via the application that he is ready to initiate an iris scan. Although in some embodiments, the computing device 104 may begin scanning without the need for confirmation from the user. The user may confirm utilizing any suitable input such as one or more blinks and/or one or more left-eye and/or right-eye winks.

At block 506, an iris scan may be received by the authentication engine 210A of FIG. 2 (e.g., operating as part of application 117 or alternatively operating on service provider computer(s) 126). For example, the application 117 may utilize one or more biometric sensor(s) (e.g., a camera, and/or the biometric sensor(s) 122 of FIG. 1) to scan the eye of a user in order to generate an iris scan for the user. The iris scan may be conveyed to the authentication engine 210A by the application 117 (e.g., via an authentication request message).

At block 508, the user may be authenticated using the received iris scan from block 506 by the authentication engine 210A. In at least one example, the authentication engine 210A may conduct an authentication process of the user by comparing the received iris scan to a stored iris scan stored as user profile data (e.g., on data store(s) 116 of FIG. 1). In at least one example, the authentication engine 210A may determine a probability that the received iris scan matches the stored iris scan.

At decision block 510, the authentication engine 210A may determine whether the user is authenticated or not. For example, the authentication engine 210A may determine whether or not the comparison resulted in a match of stored user profile data. In some examples, the authentication engine 210A may determine that the received iris scan matches a stored iris scan when the probability that the scans match is above a threshold value (e.g., 50%, 70%, 80%, etc.). The application 117 may receive indication from the authentication engine 210A (e.g., via an authentication response message) as to whether or not the comparison resulted in a match of the stored user profile data. If the comparison at block 508 does not result in a match, the transaction may be canceled at block 512. If the comparison at block 508 results in a match, then the flow may proceed to block 514.

At block 514, the user may confirm that he is ready to input his authorization code. The authorization code may include a PIN associated with a debit card, a zip code associated with an address of the user, a user-specified code for accessing a secure location or triggering an event, or any suitable series of numbers that may be utilized to authorize a transaction.

At block 516, user input may be received (e.g., via an authorization request). For example, the biometric sensor(s) 122 (e.g., an eye-tracking device) of FIG. 1 may be utilized by the application 117 to collect user input related to authorization data. As a non-limiting example, the user may be enabled to enter in a series of numerical values. In at least one embodiment, the application 117 may prompt the user to enter in a first numeric value. The user may close a single eyelid (e.g., wink) to indicate a numeric value. For example, for user-input indicating that the user closed only his left eye, the authentication engine 210A may be configured to recognize this a numeric value of "2." For user input indicating that the user closed only his right eye, the authentication engine 210A may be configured to recognize this as a numeric value of "1." The user may utilize any suitable combination of his left and/or right eyes in succession to indicate a digit of his authorization code (e.g., PIN). For example, to indicate that the first numeric value of his authorization code is "5," the user may wait to be prompted for input. The user may then wink his left eye two times and his right eye once. It should be appreciated that any order of left-eye winks and right-eye winks may be utilized. For example, the user may utilize one left-eye wink, followed by one right-eye wink, followed by one left-eye wink as another suitable combination to indicate the numeric value of "5". In at least one example, a series of five left-eye winks may indicate the numeric value of "0," although another suitable combination of eye winks may be utilized. The authorization engine 210B may receive the user input (e.g., via an authorization request message) and may convert the user-input to a numeric value. The authorization engine 210B may provide the converted user-input to the application 117 (e.g., via an authorization response message).

At block 518, the application 117 may prompt the user to confirm the user input. For example, after a threshold amount of time (e.g., one second, two seconds, etc.), the application 117 may present the user with a converted numeric value (e.g., 5) and ask the user whether the value is his intended input. The user may indicate (e.g., using one or more blinks, one or more winks, and the like) that it was the intended input or alternatively, that it wasn't the intended input. For example, the user may blink his left eye to indicate that the "5" was the intended input, or the user may blink his right eye to indicate that "5" was not the intended input. If the input was incorrect, the user may be provided the opportunity to reenter his input at block 516. If the input was converted correctly, as indicated by the user, the method may proceed to block 516 to enable the user to enter input corresponding to the next numeric value of his PIN. This process of block 516-518 may be performed any number of times corresponding to the required number of digits in the authorization code. At block 520, the application 117 may query the user to ascertain whether the authorization code has been properly entered. The user may, for example, blink his left eye to indicate that the numeric values were properly entered and his right eye to indicate that the numeric values were improperly entered (and in some example, that the user would like to renter his PIN). If the user indicates that the authorization data (e.g., the authorization code) was properly entered, the transaction may proceed to decision block 522 where the user may be authorized (e.g., by the authorization engine 210B operating on the computing device 104 or the service provider computer(s) 126) by comparing the authorization code entered by the user (and converted by the authorization engine 210B) with stored user profile data.

At decision block 524, the authorization engine 210B may determine whether or not the transaction is authorized. For example, the authorization engine 210B may determine whether or not the comparison at the decision block 522 resulted in a match of stored user profile data. If the comparison at the decision block 522 does not result in a match, the transaction may be canceled at block 526. If the comparison at block 508 results in a match, then the flow may proceed to block 528 where the transaction may be completed, for example, using the process described above in connection with FIG. 3. The application 117 may receive indication from the authorization engine 210B (e.g., via an authorization response message) as to whether or not the comparison resulted in a match of the stored user profile data. In another embodiment, the authorization engine 2106 may provide the authorization data, along with transaction data to a third-party entity computer as described above in connection with FIG. 3. In such examples, the authorization engine 210B may determine whether or not the transaction is authorized based on an authorization response message received from another computer (e.g., the authorization computer 132 of FIG. 1).

Figure 6:
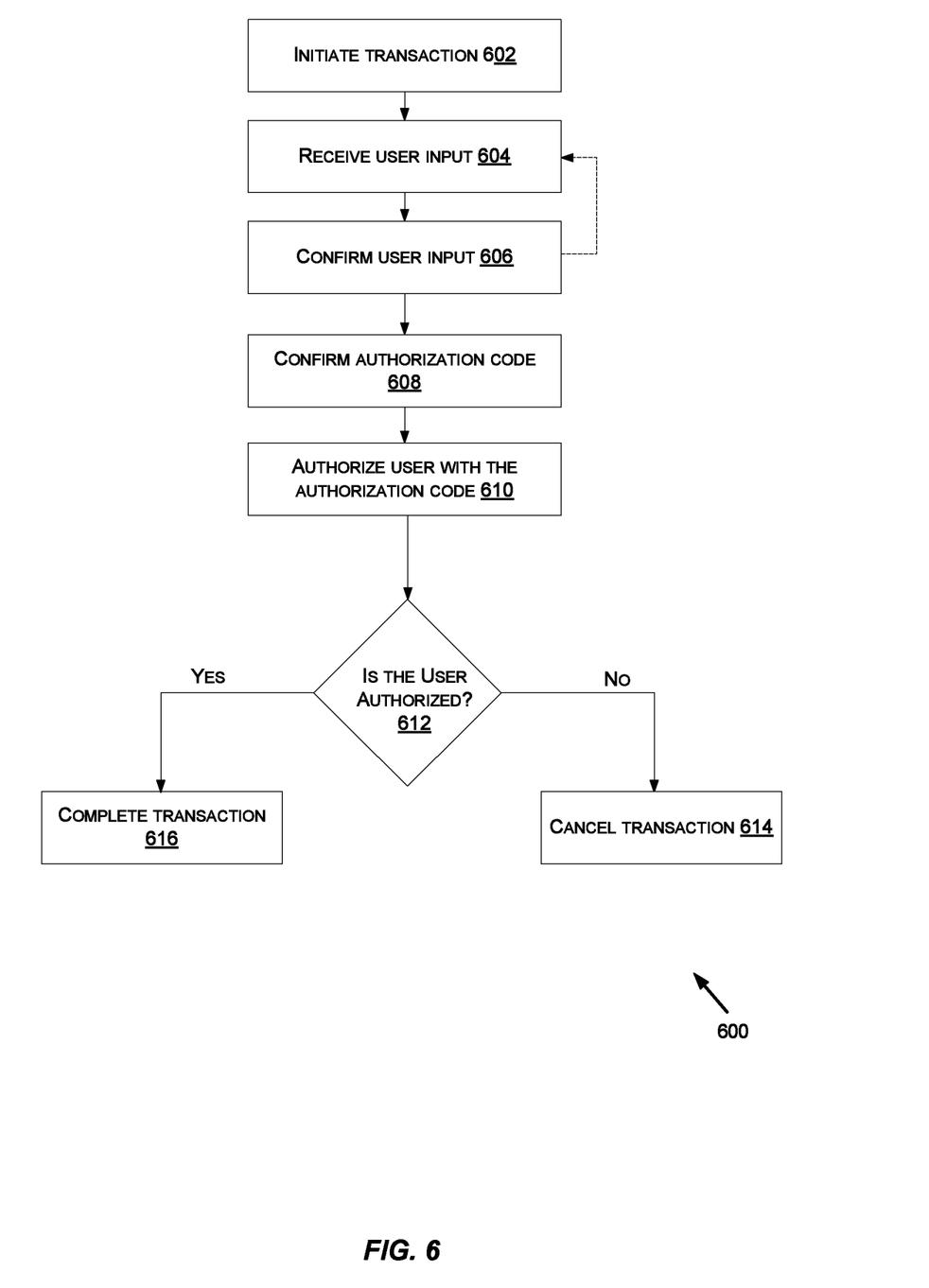
FIG. 6 shows a flowchart illustrating still one further example method of providing secure user input according to an embodiment of the invention.

FIG. 6 shows a flowchart illustrating another example method 600 of providing secure user input according to an embodiment of the invention. It should be appreciated that the method 600 does not include an authentication process as the one described above in connection with the authentication engine 210A. The method may begin at block 602 where a transaction may be initiated (e.g., via a transaction request) from a computing device (e.g., the computing device 104 of FIG. 1) via an application (e.g., the application 117 of FIG. 1). In this example, the transaction may relate to a user requesting access to a secure location (e.g., a locked door of a building).

At block 604, user input may be received (e.g., via an authorization request message). As described above, the biometric sensor(s) 122 of FIG. 1 (e.g., an eye-tracking device) may be utilized by the application 117 to collect user input. The user may be enabled to enter in a series of numerical values by providing a corresponding series of left-eye and/or right-eye winks. The authorization engine 2106 may receive the user input (e.g., via the authorization request message) and convert the user input to a numeric value. At block 606, the user may be asked to confirm the received user input after a configurable amount of time (e.g., 2 seconds, 3 seconds, or any suitable amount of time). The user may indicate (e.g., using one or more blinks, one or more winks, and the like) that it was the intended input or alternatively, that it wasn't the intended input. If the input was converted correctly, as indicated by the user, the method may proceed to block 604 to enable the user to enter input corresponding to the next numeric value of his PIN. This process of block 604-606 may be performed any number of times corresponding to the required number of digits in the authorization code.

At block 608, the application 117 may prompt the user to confirm the authorization code. For example, after a threshold amount of time (e.g., one second, two seconds, etc.), the application 117 may present the user with a converted numeric value (e.g., 7) and ask the user whether the value is his intended input. If the input is not confirmed (e.g., the user indicates that the PIN is incorrect), the process may return to block 604 where the PIN may be reentered according to the process described above. If the input is confirmed, the process may proceed to block 610.

At block 610, the user may be authorized (e.g., by the authorization engine 2106 operating on the computing device 104 or the service provider computer(s) 126) by comparing the authorization code entered by the user (and converted by the authorization engine 210B) with stored user profile data. In some embodiments, the authorization engine 210B may authorize the user further based on an authorization response message received from, for example, an authorization computer 132 of FIG. 1.

At decision block 612, the authorization engine 210B may determine whether or not the user is authorized to proceed with the transaction. For example, the authorization engine 210B may determine whether or not the comparison at block 610 resulted in a match of stored user profile data or whether or not an authorization response message indicated that the transaction was properly authorized. In some examples, the application 117 may receive indication from the authorization engine 210B as to whether or not the comparison resulted in a match of the stored user profile data. If the comparison at the decision block 612 does not result in a match, the transaction may be canceled at block 614. In at least one example, cancellation may providing the user feedback indicating the cancellation and a return to block 604 to enable the user to enter a new authorization code.

If the comparison at the decision block 612 results in a match, then the process may proceed to block 616 where the transaction may be completed, for example, using the process described above in connection with FIG. 3.

In some examples, the decision at decision block 612 may be based on an authorization response message indicating that the transaction was authorized, or alternatively, that the transaction was not authorized.

Technical Benefits

Embodiments of the invention have a number of advantages. Embodiments of the invention allow for secure entry of sensitive authentication/authorization information (e.g., biometric data and/or an authorization code) utilizing a computing device configured with a biometric sensor and/or an eye-tracking device. By utilizing such a device according to the methods described above, the user is enabled to enter his input without the fear of someone witnessing the entry and stealing his information. Additionally, the user is enabled to provide input without the need of his hands. This provides the user a more enjoyable data entry experience. This is especially true for users of a virtual reality device, who otherwise would be required to remove the device, or enter the input by hand gestures, which may disrupt the virtual reality experience. Additionally, for users who may be physically handicapped (e.g., lack the ability to use their hands), the embodiments of the invention provide the user with the ability to enter hands-free user input.

GENERALLY

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method, comprising:
    receiving, by a computing device, a plurality of inputs caused by a combination of at least two of: a left-eye wink by a user or a right-eye wink by the user;
    converting the plurality of inputs to a numeric value corresponding to a digit of an authorization code, wherein converting the plurality of inputs to the numeric value comprises calculating the numeric value based at least in part on at least one of: a first value corresponding to a first number of left-eye winks of the plurality of inputs and a second value corresponding to a second number of right-eye winks of the plurality of inputs;
    determining that a threshold amount of time has elapsed since a last input of the plurality of inputs;
    in response to determining that the threshold amount of time has elapsed, providing the numeric value converted from the plurality of inputs to the user for validation;
    receiving user input indicating that the numeric value converted from the plurality of inputs is correct; and
    authorizing the user based at least in part on the numeric value corresponding to the digit of the authorization code and the received user input indicating that the numeric value is correct.

2. The method of claim 1, wherein converting the plurality of inputs to the numeric value further comprises:
    determining the first number of left-eye winks of the plurality of inputs;
    calculating the first value corresponding to the first number of left-eye winks by multiplying the first number by two;
    determining the second number of right-eye winks of the plurality of inputs, wherein the numeric value is generated by adding the second number to the first value.

3. The method of claim 1, wherein an individual input of the plurality of inputs is submitted by the user within a threshold period of time with respect to other inputs of the plurality of inputs.

4. The method of claim 1, wherein the computing device is configured to track eye movements of the user.

5. The method of claim 1, wherein the computing device is configured to provide an image of an iris of the user.

6. The method of claim 1, further comprising:
    receiving, by the computing device, a transaction request, wherein the transaction request includes an iris scan associated with the user of the computing device;
    authenticating the user based on the iris scan; and
    processing the transaction request based on the iris scan and the numeric value corresponding to the digit of the authorization code.

7. The method of claim 6, wherein the transaction request relates to a payment initiated in a virtual reality environment.

8. The method of claim 1, wherein the user input indicating that the numeric value converted from the plurality of inputs is correct comprises a subsequent eye wink.

9. A computing device, comprising:
    a processor,
    one or more eye-tracking devices; and
    a non-transitory computer readable medium coupled to the processor, the computer readable medium comprising code that, when executed by the processor, cause the computing device to:
        receive, from the one or more eye-tracking devices, a plurality of inputs caused by a combination of at least two of: a left-eye wink by a user or a right-eye wink by the user;
        convert the plurality of inputs to a numeric value, the numeric value corresponding to a digit of an authorization code, wherein converting the plurality of inputs to the numeric value comprises calculating the numeric value based at least in part on at least one of: a first number of left-eye winks of the plurality of inputs and a second number of right-eye winks of the plurality of inputs;
        determine that a threshold amount of time has elapsed since a last input of the plurality of inputs;
        in response to determining that the threshold amount of time has elapsed, provide the numeric value converted from the plurality of inputs to the user for validation;
        receive user input indicating that the numeric value converted from the plurality of inputs is correct; and
        authorize the user based at least in part on the numeric value converted from the plurality of inputs and the received user input indicating that the numeric value converted from the plurality of inputs is correct.

10. The computing device of claim 9, wherein converting the plurality of inputs to the numeric value further comprises:
    determining the first number of left-eye winks of the plurality of inputs;
    calculating the first value corresponding to the first number of left-eye winks by multiplying the first number by two;
    determining the second number of right-eye winks of the plurality of inputs, wherein the numeric value is generated by adding the second number to the first value.

11. The computing device of claim 9, wherein an individual input of the plurality of inputs is submitted by the user within the threshold amount of time with respect to other inputs of the plurality of inputs.

12. The computing device of claim 9, wherein the one or more eye-tracking devices are configured to track eye movements of the user.

13. The computing device of claim 9, wherein the computing device further comprises one or more biometric sensors configured to scan an iris of the user.

14. The computing device of claim 9, wherein the computing device is further caused to:
    receive a transaction request comprising an iris scan associated with the user of the computing device;
    authenticate the user based on the iris scan; and process the transaction request based on the iris scan and the numeric value corresponding to the digit of the authorization code.

15. The computing device of claim 14, wherein the transaction request relates to a payment initiated in a virtual reality environment.

16. A method, comprising:
    receiving, by a computing device, a transaction request including transaction information of a transaction between a user and a merchant;
    receiving, by the computing device, an authentication request message, wherein the authentication request message includes an iris scan associated with the user of the computing device;
    authenticating, by the computing device, the user based on the iris scan;
    obtaining a plurality of digits of an authorization code, wherein obtaining each digit comprises:
        receiving, by the computing device, an authorization request message comprising a plurality of inputs caused by a combination of at least two of: a left-eye wink by the user or a right-eye wink by the user;
        converting, by the computing device, values corresponding to each of the plurality of inputs to generate a numeric value, the numeric value corresponding to a digit of the authorization code, wherein converting values corresponding to each of the plurality of inputs to the numeric value comprises calculating the numeric value based at least in part on at least one of: a first number of left-eye winks of the plurality of inputs and a second number of right-eye winks of the plurality of inputs;
        determining, by the computing device, that a threshold amount of time has elapsed since a last input of the plurality of inputs;
        in response to determining that the threshold amount of time has elapsed, providing, by the computing device, the numeric value converted from the plurality of inputs to the user for validation; and
        receiving, by the computing device, user input indicating that the numeric value converted from the plurality of inputs is correct;
    authorizing, by the computing device, the user based on the obtained authorization code; and
    processing, by the computing device, the transaction request when the user is authenticated and authorized.

17. The method of claim 16, wherein authenticating the user based on the iris scan further comprises:
    comparing the received iris scan to a stored iris scan of the user; and
    determining that the user is authenticated when the received iris scan matches the stored iris scan within a threshold probability.

18. The method of claim 16, wherein authorizing the user based on the obtained authorization code further comprises:
    comparing the obtained authorization code to a stored authorization code;
    determining that the user is authorized when the obtained authorization code matches the stored authorization code.

19. The method of claim 16, further comprising:
    providing the plurality of digits of the obtained authorization code to the user for validation;
    receiving subsequent user-input that indicates that the plurality of digits of the obtained authorization code are valid, wherein authorizing the user is further based on the subsequent user input.

20. The method of claim 19, wherein the subsequent user-input that indicates that the plurality of digits of the obtained authorization code are valid comprises a subsequent eye wink.

* * * * *